United States Patent
Lin et al.

(10) Patent No.: US 6,418,949 B1
(45) Date of Patent: Jul. 16, 2002

(54) MULTIPLE-FOLD UMBRELLA SHAFT HAVING TELESCOPIC TUBES OUTWARDLY DECREASED IN CONCAVE QUADRANTS

(75) Inventors: Chung-Kuang Lin; Jung-Jen Chang, both of Taipei Hsien (TW)

(73) Assignee: Fu Tai Umbrella Works Ltd., Taipei Hsien (TW)

( * ) Notice: Subject to any disclaimer, the term of this patent is extended or adjusted under 35 U.S.C. 154(b) by 9 days.

(21) Appl. No.: 09/604,775

(22) Filed: Jun. 28, 2000

(51) Int. Cl.⁷ .............................................. A45B 19/00
(52) U.S. Cl. ...................... 135/25.1; 135/25 A; 135/75; 403/777
(58) Field of Search ................. 135/25.4, 25.1, 135/75, 25.3; 462/162; 403/77

(56) References Cited

U.S. PATENT DOCUMENTS

| | | | | |
|---|---|---|---|---|
| 401,536 A | * | 4/1889 | Box | 135/75 X |
| 849,407 A | * | 4/1907 | Lowrie | 298/34 |
| 5,302,262 A | * | 4/1994 | Yamafuji et al. | 204/153.12 |
| 5,387,048 A | * | 2/1995 | Kuo | 403/109 |
| 5,494,064 A | * | 2/1996 | Lee | 135/28 |
| 5,720,311 A | * | 2/1998 | Lin et al. | 135/25.1 |
| 5,740,823 A | * | 4/1998 | Lin et al. | 135/24 |
| 5,789,250 A | * | 8/1998 | Ikezaki | 436/20 |
| 5,791,359 A | * | 8/1998 | Lin et al. | 135/24 |
| 5,862,063 A | * | 1/1999 | Thome et al. | 364/723 |
| 5,911,233 A | * | 6/1999 | Wu | 135/28 |
| 6,016,822 A | * | 1/2000 | Lin et al. | 135/24 |
| 6,035,873 A | * | 3/2000 | Lin et al. | 135/25.1 |
| 6,046,773 A | * | 4/2000 | Martens et al. | 348/384 |
| 6,112,755 A | * | 9/2000 | Lin et al. | 135/24 |
| 6,176,246 B1 | * | 1/2001 | Lin et al. | 135/24 |
| 6,216,712 B1 | * | 4/2001 | Lin et al. | 135/31 |

\* cited by examiner

*Primary Examiner*—Daniel P. Stodola
*Assistant Examiner*—Khoa Tran
(74) *Attorney, Agent, or Firm*—Troxell Law Office PLLC

(57) ABSTRACT

A multiple-fold umbrella shaft, consisting of a plurality of tubes telescopically engageable with one another, includes an inner tube having concave quadrants designated as Vi, and an outer tube slidably engageable with the inner tube and having concave quadrants designated as Vo, forming a relationship as defined by a formula of $Vi-Vo \geq 1$ in order for preventing twisting and vibration of the tubes and for enhancing a smooth folding or unfolding operation when closing or opening the umbrella.

1 Claim, 6 Drawing Sheets

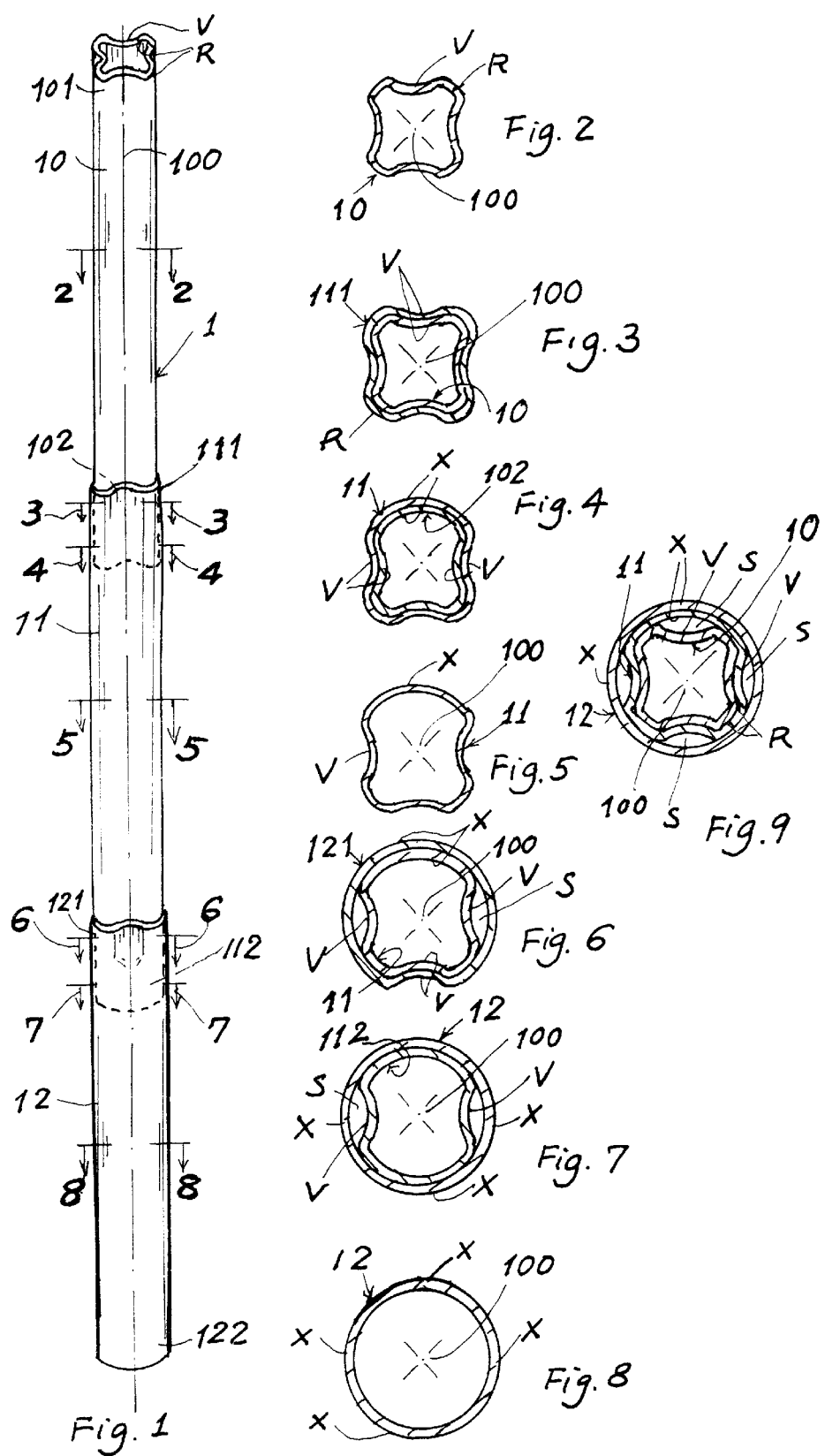

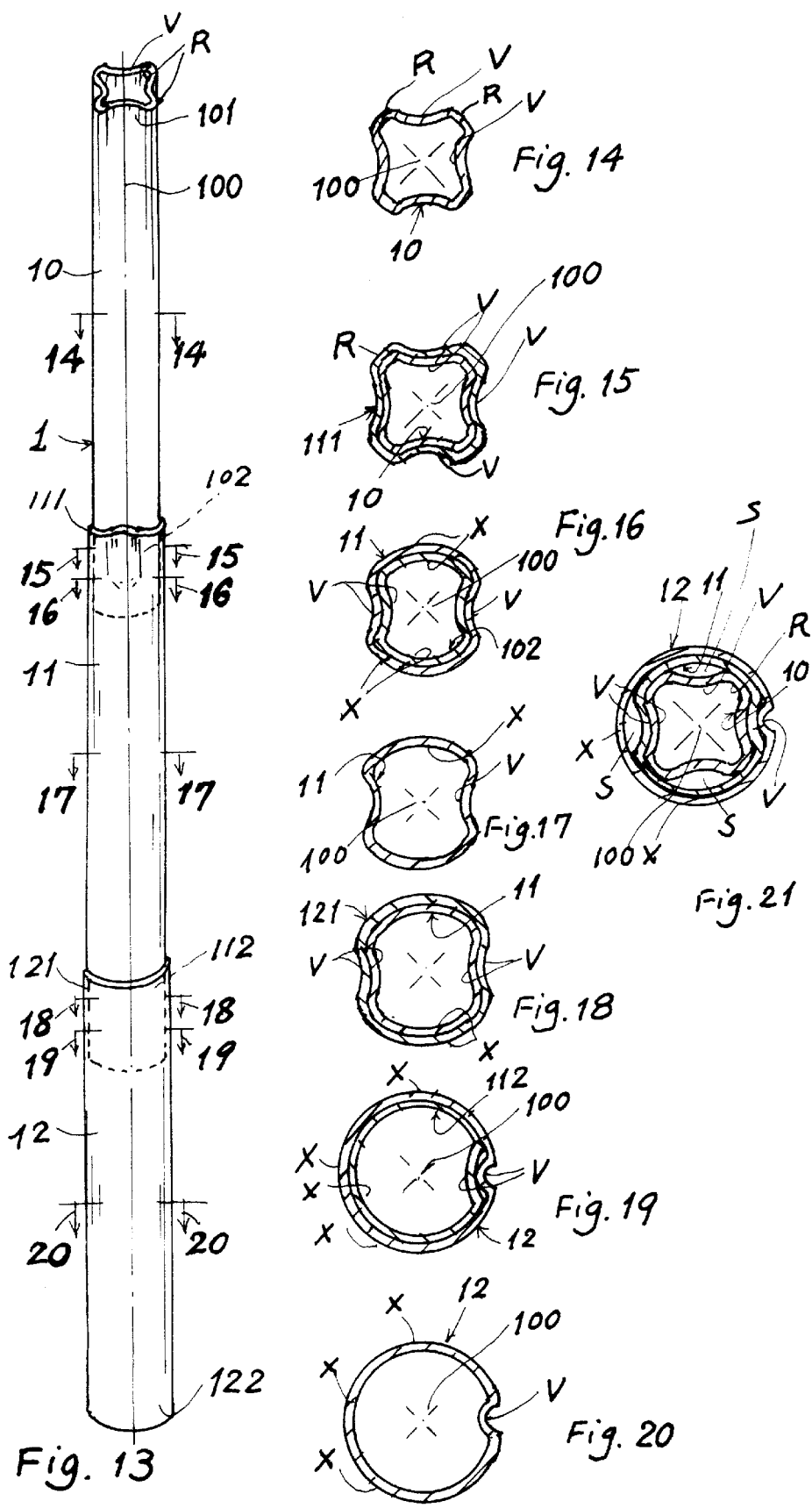

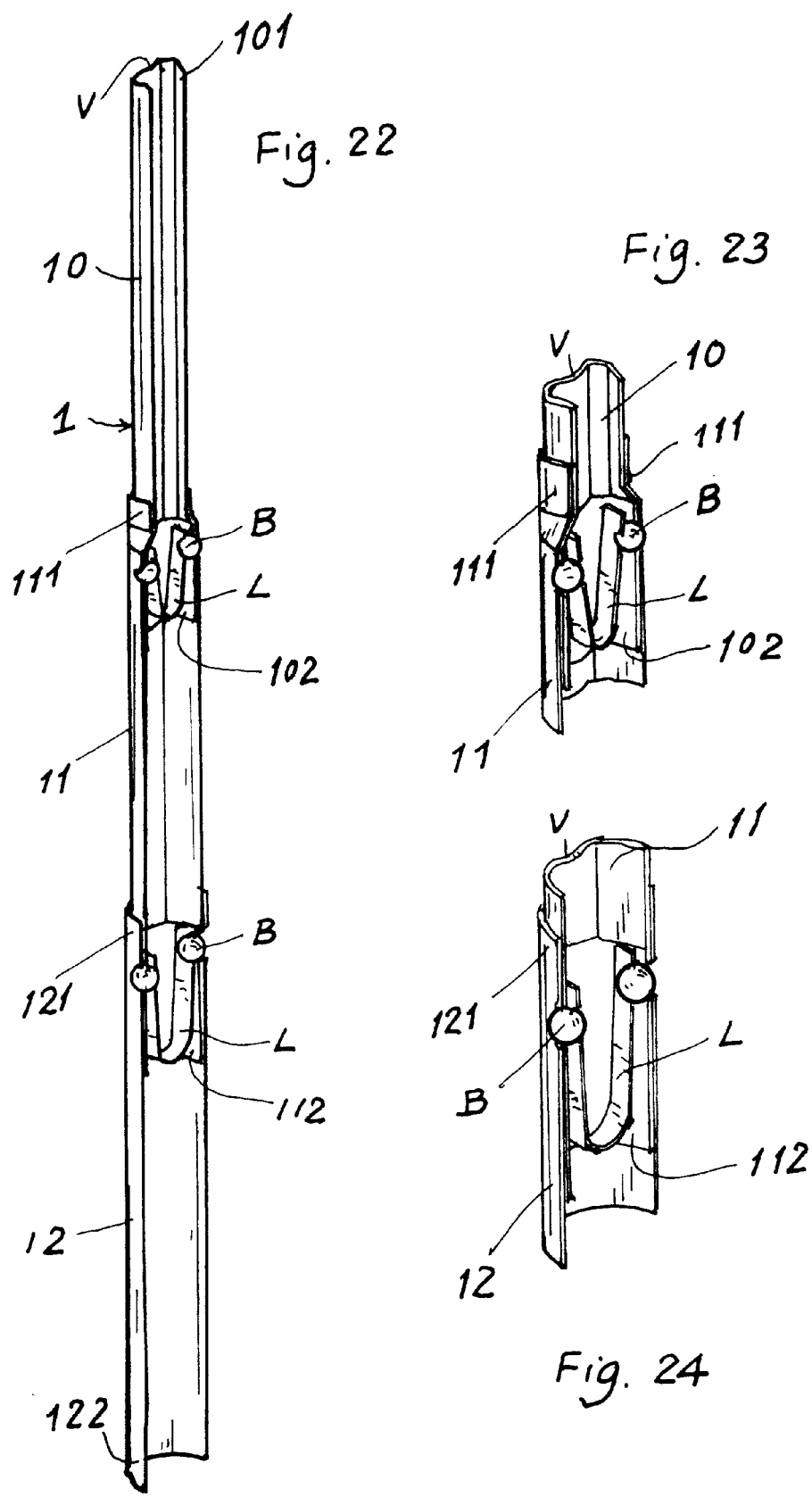

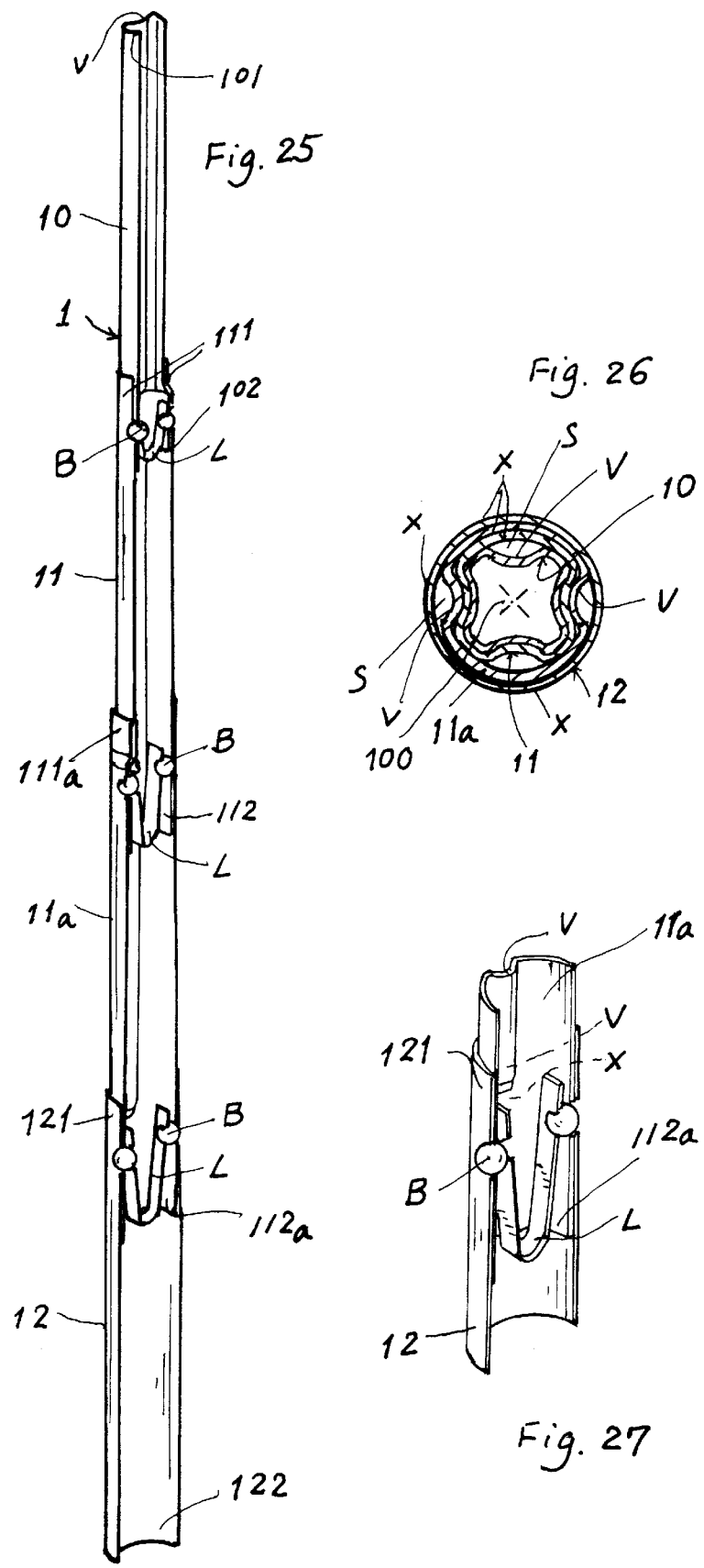

MULTIPLE-FOLD UMBRELLA SHAFT HAVING TELESCOPIC TUBES OUTWARDLY DECREASED IN CONCAVE QUADRANTS

BACKGROUND OF THE INVENTION

U.S. Pat. No. 6,035,873 issued to the same inventors of this application disclosed a multiple-fold umbrella having gradationally convex telescopic shaft consisting of five or four tubes telescopically engageable with one another. However, there is a large sliding contact area between an outer tube and a corresponding or neighboring inner tube engageable with the outer tube, thereby influencing a smooth folding on unfolding operation of the central shaft when closing or opening the umbrella due to frictional contact between the outer and inner tubes.

The present inventor has found the drawback of the prior patent and invented the present umbrella shaft for a more smooth folding and unfolding operation.

SUMMARY OF THE INVENTION

The object of the present invention is to provide a multiple-fold umbrella shaft, consisting of a plurality of tubes telescopically engageable with one another, including an inner tube having concave quadrants designated as Vi, and an outer tube slidably engageable with the inner tube and having concave quadrants designated as Vo, forming a relationship as defined by a formula of Vi−Vo≧1 in order for preventing twisting and vibration of the tubes and for enhancing a smooth folding or unfolding operation when closing or opening the umbrella.

BRIEF DESCRIPTION OF THE DRAWINGS

FIG. 1 is an illustration of the present invention when extended.

FIG. 2 is a cross sectional drawing as viewed from 2—2 direction of FIG. 1.

FIG. 3 is a cross sectional drawing as viewed from 3—3 direction of FIG. 1.

FIG. 4 is a cross sectional drawing as viewed from 4—4 direction of FIG. 1.

FIG. 5 is a cross sectional drawing as viewed from 5—5 direction of FIG. 1.

FIG. 6 is a cross sectional drawing as viewed from 6—6 direction of FIG. 1.

FIG. 7 is a cross sectional drawing as viewed from 7—7 direction of FIG. 1.

FIG. 8 is a cross sectional drawing as viewed from 8—8 direction of FIG. 1.

FIG. 9 is a cross sectional drawing of the tubes when folded from FIG. 1.

FIG. 13 is an illustration showing another preferred embodiment of the present invention.

FIG. 14 is a cross sectional drawing as viewed from 14—14 direction of FIG. 13.

FIG. 15 is a cross sectional drawing as viewed from 15—15 direction of FIG. 13.

FIG. 16 is a cross sectional drawing as viewed from 16—16 direction of FIG. 13.

FIG. 17 is a cross sectional drawing as viewed from 17—17 direction of FIG. 13.

FIG. 18 is a cross sectional drawing as viewed from 18—18 direction of FIG. 13.

FIG. 19 is a cross sectional drawing as viewed from 19—19 direction of FIG. 13.

FIG. 20 is a cross sectional drawing as viewed from 20—20 direction of FIG. 13.

FIG. 21 is a cross sectional drawing of the tubes when folded from FIG. 13.

FIG. 22 is a partially cut-away view from FIG. 13.

FIG. 23 is a partial enlarged view of FIG. 13 showing the coupling of the inner tube and the middle tube.

FIG. 24 shows the coupling of the middle tube and the outer tube.

FIG. 25 is a cut-away illustration showing still another preferred embodiment of the present invention.

FIG. 26 is a cross sectional drawing of the tubes when folded from FIG. 25.

FIG. 27 shows the coupling of the outer tube with its corresponding middle tube as shown in FIG. 25.

DETAILED DESCRIPTION

Figure 10:
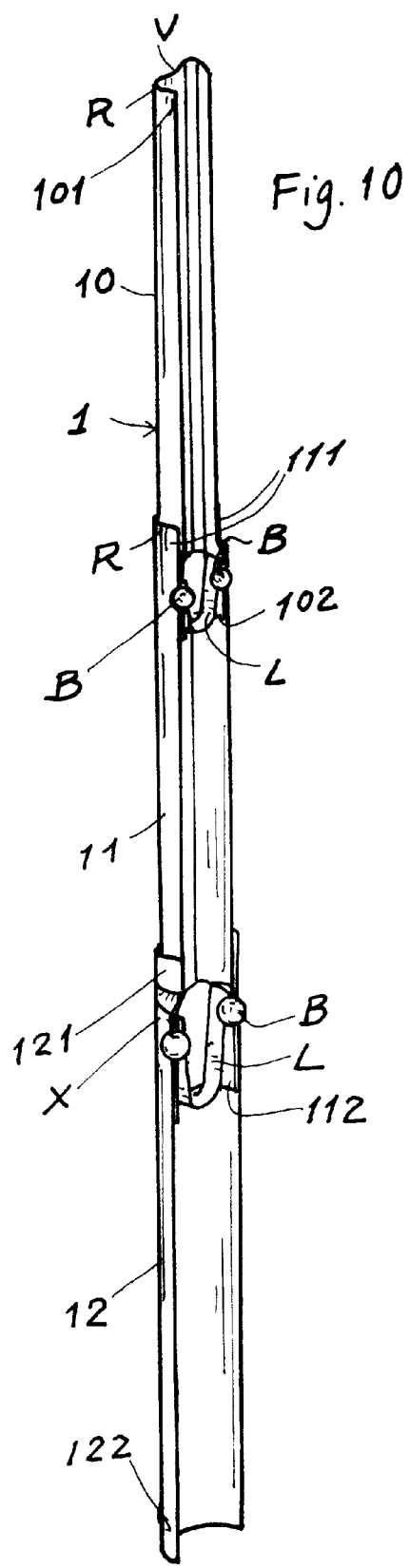
FIG. 10 is a partially cut-away illustration of the present invention of FIG. 1.
Figure 11:
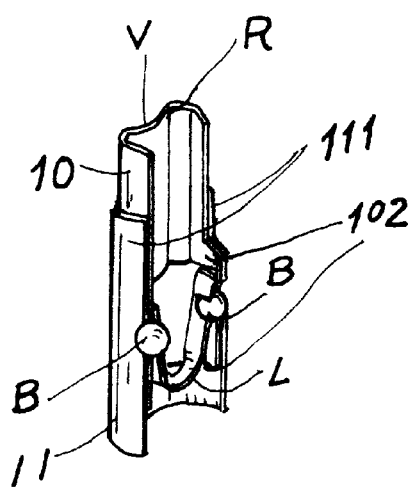
FIG. 11 is a partial enlarged view of FIG. 10 showing the coupling of an inner tube and a middle tube of the present invention.

As shown in FIGS. 1~12, a preferred embodiment of the multiple-fold umbrella shaft 1 of the present invention comprises: an inner tube 10, a middle tube 11 telescopically engageable with the inner tube 10, and an outer tube 12 telescopically engageable with the middle tube 11. This embodiment is adapted for use in triple-fold umbrella. But, the present invention does not limit its uses in an umbrella concerning the number of folds of the umbrella. For reducing frictional contact among the tubes, a triple-fold or quadruple-fold umbrella is preferable.

The inner tube 10, especially in FIG. 2, has a cross section consisting of four concave quadrants V each concave centripetally (or radially inwardly) towards a longitudinal axis 100 defined at a longitudinal center of the shaft 1, with every two neighboring concave quadrants V confining a ridge portion R convex radially outwardly between the two concave quadrants V. A spring catch (not shown) may be provided in two opposite ridge portions R in the inner tube 10 for retaining a runner on the shaft 1 when opening the umbrella.

The inner tube 10 has its upper portion 101 provided for forming an upper notch (not shown) thereon for pivotally securing a rib assembly on the shaft 1. The outer tube 12 has a lower portion 122 secured with a grip (not shown). Those conventional elements of the umbrella are not described in detail in this specification.

The middle tube 11, especially as shown in FIG. 5, has a cross section consisting of three concave quadrants V each concave radially inwardly towards the axis 100 defined at a center of the shaft 1 with every two neighboring concave quadrants V defining a ridge portion R convex radially outwardly; and a convex quadrant X convex radially outwardly from the axis 100. The middle tube 11 is engageable with and slidably surrounding the inner tube 10 so that the middle tube 11 may be considered (or explained) as an "outer tube" of the inner tube 10.

The number of concave quadrants V of the middle tube 11 is designated as Vo, Vo=3; and the number of concave quadrants V of the inner tube 10 is designated as Vi, V=4, thereby obtaining the following result:

$$Vi-Vo=4-3=1$$

which is commensurate with the inventive principle of the present invention, namely, $$Vi-Vo \geq 1$$

The inner tube 10 has its lower portion 102 diverging outwardly to form a cross section consisting of a convex quadrant X and three concave quadrants V in addition to the convex quadrant X to be slidably engageable with the middle tube 11; and the middle tube 11 has its upper portion 111 converging inwardly to form a cross section consisting of four concave quadrants V to be slidably engageable with the inner tube 10. The lower portion 102 of the inner tube 10 will be upwardly limited by the upper portion 111 of the middle tube 11 when extending the tubes of the shaft 1 for opening the umbrella, thereby preventing releasing of the inner tube 10 from the middle tube 11.

Furthermore, a spring lock L is resiliently held at the coupling portion of the inner and outer tubes 10, 11 as shown in FIG. 10, 11 for preventing separation of the two coupled tubes 10, 11; each spring lock L resiliently urging a pair of balls B for respectively coupling two ball holes respectively formed in the two tubes telescopically engageable with each other for stably coupling the two tubes when opening the umbrella. Other coupling devices or locks may be used or modified.

The outer tube 12 has a cross section of circular shape, especially as shown in FIG. 8, consisting of four convex quadrants X which form a circle, indicating that there is no concave quadrant V in the major portion of the outer tube 12. The outer tube 12 will serve as an "outer tube" of the middle tube 11 substantially.

The number of concave quadrants V of the outer tube 12 is zero, Vo=0; and the number of the middle tube 11 (which can be considered as an "inner tube" of the outer tube 12) is "3", Vi=3, thereby obtaining the following result:

$$Vi-Vo=3-0=3$$

which is commensurate with the principle of the present invention, namely, $$Vi-Vo \geq 1$$

Figure 12:
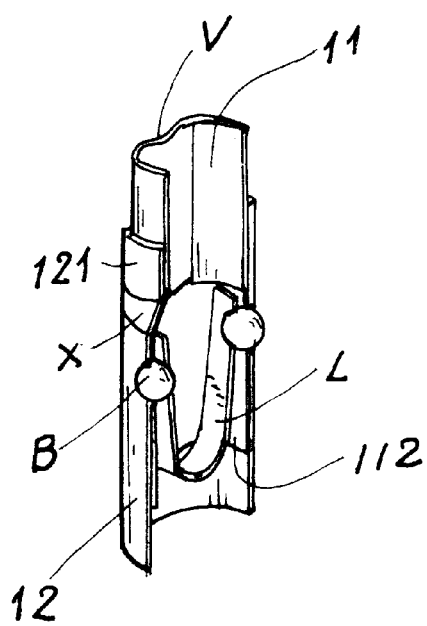
FIG. 12 is a partial enlarged view showing the coupling of the middle tube and an outer tube of the present invention.

The outer tube 12 has its upper portion 121 converging to form a cross section having a concave quadrant V in addition to three convex quadrants X to be slidably engageable with the middle tube 11; and the middle tube 11 has its lower portion 112 diverging to form a cross section having two concave quadrants V and two convex quadrants X to be slidably engageable with the outer tube 12, thereby limiting the two tubes 11, 12 to prevent their separation from each other when opening the umbrella especially by the aid of the spring lock L having two balls B coupling the two tubes 11, 12 which are coupled as shown in FIGS. 10, 12.

Another preferred embodiment of the present invention is shown in FIGS. 13~24. The umbrella shaft 1 comprises: an inner tube 10 having a cross section consisting of four concave quadrants V; a middle tube 11 having a cross section consisting of two concave quadrants V symmetrically recessed inwardly in two opposite side portions of the middle tube and two convex quadrants X symmetrically curved outwardly from the axis 100 of the shaft 1 to form a two-lobe shape configuration as shown in FIG. 17; and an outer tube 12 having a cross section consisting of one concave quadrant V and three convex quadrants X.

In this embodiment, the difference of concave quadrants V between the inner tube 10 and the middle tube 11 is obtained by:

$$Vi-Vo=4-2=2(2>1)$$

wherein Vi is the number of concave quadrants V of the inner tube 10 and is 4; and Vo is the concave quadrants V of the "outer tube", namely, the middle tube 11 (now serving as an "outer tube" with respect to the inner tube 10), and is 2.

The difference of concave quadrants V between the middle tube 11 (Vi=2) and the outer tube 12 (Vo=1) is obtained by:

$$Vi-Vo=2-1=1$$

Accordingly, the difference of concave quadrants V between every two neighboring (or coupling) tubes (namely, the "inner" and "outer" tubes) of the second embodiment as shown in FIGS. 13~24 is 2 or 1 respectively as aforementioned, which satisfies the principle of the present invention as shown as follows:

$$Vi-Vo \geq 1$$

As shown in FIGS. 9, 21, since a difference of concave quadrants V may be larger than 1 (or equal to 1) between the inner and outer tubes, several "arcuate chambers S" will be formed with each "arcuate chamber S" confined between each concave quadrant V and each convex quadrant X, indicating that there is an enough space provided by each said "arcuate chamber S" to reduce the frictional resistance between the tubes to allow a smooth sliding movement of the inner and outer tubes during folding or unfolding operation when closing or opening the umbrella. Nevertheless, the concave quadrants V of the two coupled or engaged tubes may still prevent the twisting or vibration of the tubes during the folding or unfolding operation of the present invention.

So, this invention provides two engineering choices, namely, $$Vi-Vo>1; \tag{1}$$

and $$Vi-Vo=1 \tag{2}$$

for well accommodating optimum "arcuate chambers S" between each pair of "inner tube" and "outer tube" for smoothly operating the tubes of the umbrella shaft to be superior to the prior art of U.S. Pat. No. 6,035,873.

As shown in FIGS. 15, 16, 22 and 23, the inner tube 10 has its lower portion 102 diverging to have two convex quadrants X and the middle tube 11 has its upper portion 111 converging to have four concave quadrants V for coupling the inner and middle tubes 10, 11 to prevent their separation from each other.

As shown in FIGS. 18, 19, 22 and 24, the middle tube 11 has its lower portion 112 diverging to have three convex quadrants X (from original two convex quadrants X) to be slidably engageable with the outer tube 12; while the outer tube 12 has its upper portion 121 converging to have two concave quadrants V (from original one concave quadrant V) to be slidably engageable with the middle tube 11, thereby coupling the middle tube 11 and the outer tube 12 for preventing separation from each other. At each coupling portion, a spring lock L is provided for resiliently urging a pair of balls B for coupling the inner and outer tubes.

For coupling the inner and outer tubes and for preventing separation of the two tubes as coupled, the inner tube may diverge its coupling end portion to be slidably engageable with the outer tube; and the outer tube may converge its coupling end portion to be slidably engageable with the inner tube, whereby upon outward withdrawal of the inner tube from the outer tube, the inner tube will be limited by the outer tube to prevent the separation of the two tubes. Still another preferred embodiment of the present invention is shown in FIGS. 25~27 which may be adapted for quadruple-fold umbrella.

Such a shaft 1 comprises: an inner tube 10 having a cross section consisting of four concave quadrants V; a first middle tube 11 telescopically engageable with the inner tube 10 and having a cross section consisting of three concave quadrants V and a convex quadrant X, indicating that the number of concave quadrants V is decreased from the inner tube 10 with a decrement of 1 ($V_i-V_o=4-3=1$); a second middle tube 11a telescopically engageable with the first middle tube 11 and having two concave quadrants V and two convex quadrants X, indicating that the number of concave quadrants V is decreased from the first middle tube 11 with a decrement of 1 ($V_i-V_o=3-2=1$); and an outer tube 12 telescopically engageable with the second middle tube 11a and having zero concave quadrants V (but having four convex quadrants X which form a circle), indicating the number of concave quadrants V is decreased from the second middle tube 11a with a decrement of 2 ($V_i-V_o=2-0=2$).

Therefore, the decrement of each pair of inner and outer tubes is ranging from 1~2 as above-calculated, and is commensurate with the principle of this application, namely, $$V_i-V_o>1$$

At the coupling portion of the inner and outer tubes, the inner tube has its lower portion diverging to be slidably engageable with the outer tube; and the outer tube has it upper portion converging to be slidably engageable with the inner tube, thereby preventing the separation of the two tubes from each other.

For instance, the outer tube 12 as shown in FIG. 27 has its upper portion 121 converging inwardly to have a concave quadrant V to be slidably engageable with the second middle tube 11a having two concave quadrants V, and the second middle tube 11a having its lower portion 112a diverging outwardly to increase the convex quadrants X to be slidably engageable with the outer tube 12, thereby preventing their separation from one another.

Figure 28:
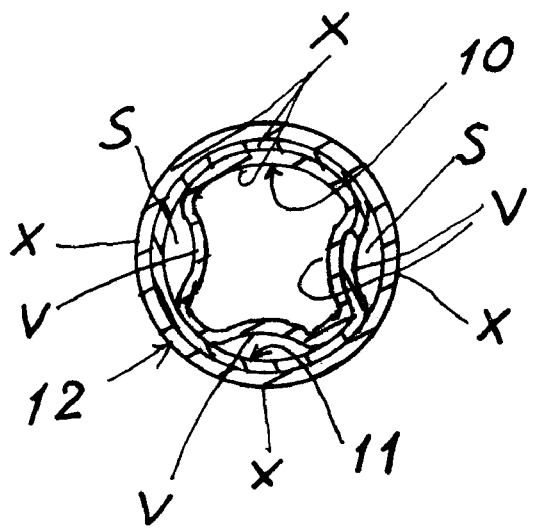
FIG. 28 is a cross sectional drawing of further preferred embodiment of the present invention when folded.
Figure 29:
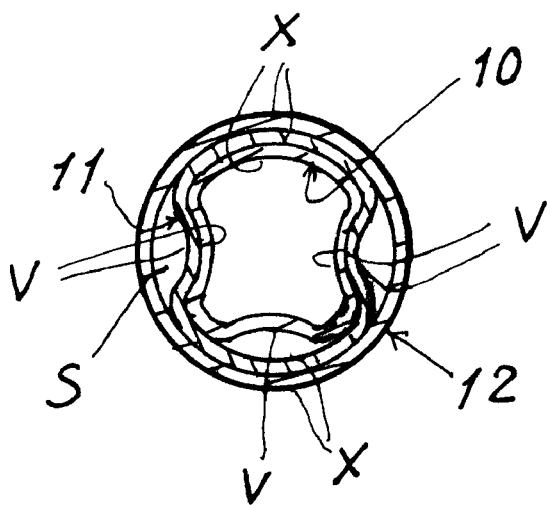
FIG. 29 is a cross sectional drawing of still further preferred embodiment of the present invention when folded.

The present invention may be modified without departing from the spirit and scope of this invention. In FIG. 28, the inner tube 10 has three concave quadrants (3V), the middle tube 11 having one concave quadrant (1V), and the outer tube 12 having zero concave quadrant (0V), forming decreased order of concave quadrants of 3→1→0 from the inner tube, through the middle tube, to the outer tube. In FIG. 29, the concave quadrants V are decreased in order of 3V→2V→0V from inner tube 10, through middle tube 11, to outer tube 12.

We claim:

1. A multiple-fold umbrella shaft comprising:

a plurality of tubes telescopically engaged with one another, a longitudinal axis defined at a longitudinal center of said tubes, each of said tubes having number of concave quadrants ranging from zero to an integer, each said concave quadrants curving radially inwardly towards said longitudinal axis; said plurality of tubes forming a first group of pairs of tubes and a second group of pairs of tubes, each pair of tubes including an inner tube having number $V_i$ of concave quadrants; and an outer tube telescopically engaged with said inner tube and having number $V_o$ of concave quadrants, forming a difference ($V_i-V_o$) of the concave quadrants between the inner and outer tubes, said first group of pairs of tubes conforming to a first formula of: (1) $V_i-V_o>1$; and said second group of pairs of tubes conforming to a second formula of: (2) $V_i-V_o=1$.

* * * * *